(12) United States Patent
Horng et al.

(10) Patent No.: US 11,043,871 B2
(45) Date of Patent: Jun. 22, 2021

(54) STATOR OF A WATERPROOF MOTOR AND METHOD FOR MANUFACTURING THE SAME

(71) Applicant: Sunonwealth Electric Machine Industry Co., Ltd., Kaohsiung (TW)

(72) Inventors: Alex Horng, Kaohsiung (TW); Guo-Hao Chen, Kaohsiung (TW); Chi-Tsung Tsai, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 16/217,245

(22) Filed: Dec. 12, 2018

(65) Prior Publication Data

US 2019/0245406 A1     Aug. 8, 2019

(30) Foreign Application Priority Data

Feb. 8, 2018  (TW) .................................. 107104551

(51) Int. Cl.
*H02K 5/10* (2006.01)
*H02K 3/50* (2006.01)
(Continued)

(52) U.S. Cl.
CPC ................. *H02K 5/10* (2013.01); *H02K 3/50* (2013.01); *H02K 5/08* (2013.01); *H02K 11/30* (2016.01);
(Continued)

(58) Field of Classification Search
CPC ............ H02K 5/10; H02K 15/10; H02K 5/08; H02K 15/0068; H02K 15/14; H02K 15/12;
(Continued)

(56) References Cited

U.S. PATENT DOCUMENTS 5,814,412 A * 9/1998 Terada .................... C08L 63/00
428/458
6,828,706 B2 * 12/2004 Kudo .................... F04D 29/023
310/43
(Continued)

FOREIGN PATENT DOCUMENTS

CN        101154849 A    4/2008
JP        H11252867 A    9/1999
(Continued)

OTHER PUBLICATIONS

Silica gel is a unique adhesive sealant (Year: 2013).*
(Continued)

*Primary Examiner* — Ahmed Elnakib
(74) *Attorney, Agent, or Firm* — Alan D. Kamrath; Karin L. Williams; Mayer & Williams PC (57) ABSTRACT

A method for manufacturing a stator of a waterproof motor includes disposing a first assembly in a mold where the first assembly includes a coil unit wound around an iron core assembly and filling the mold with a thermosetting plastic which forms a housing after curing. The housing envelops the coil unit and the iron core assembly. A recess is formed at one end of the housing. The method further includes disposing a second assembly in the recess of the housing where the second assembly includes a circuit unit and filling the recess of the housing with a waterproof glue which envelops the circuit unit after curing. According to the above, the stator of the waterproof motor is formed.

9 Claims, 12 Drawing Sheets

(51) Int. Cl.
*H02K 11/30* (2016.01)
*H02K 15/12* (2006.01)
*H02K 15/14* (2006.01)
*H02K 15/00* (2006.01)
*H02K 5/08* (2006.01)
*H02K 15/10* (2006.01)

(52) U.S. Cl.
CPC ......... *H02K 15/0068* (2013.01); *H02K 15/10* (2013.01); *H02K 15/12* (2013.01); *H02K 15/14* (2013.01); *H02K 2211/03* (2013.01)

(58) Field of Classification Search
CPC ...... H02K 11/30; H02K 3/50; H02K 2211/03; H02K 11/0094; H02K 5/04; H02K 15/02; H02K 1/2786
USPC .................................. 310/43, 45, 71; 29/596
See application file for complete search history.

(56) References Cited

U.S. PATENT DOCUMENTS

| | | | | |
|---|---|---|---|---|
| 7,498,762 | B2* | 3/2009 | Takada | H02K 1/2786 310/43 |
| 7,635,934 | B2 | 12/2009 | Zhu et al. | |
| 7,994,663 | B2 | 8/2011 | Harata et al. | |
| 8,269,380 | B2 | 9/2012 | Amaya et al. | |
| 8,506,264 | B2* | 8/2013 | Horng | F04D 25/0606 310/52 |
| 8,643,232 | B2 | 2/2014 | Hung et al. | |
| 8,747,082 | B2 | 6/2014 | Yi et al. | |
| 2004/0256933 | A1* | 12/2004 | Toyokawa | H02K 5/1675 310/89 |
| 2007/0085126 | A1 | 4/2007 | Lee et al. | |
| 2007/0085426 | A1* | 4/2007 | Lee | H02K 1/04 310/43 |
| 2007/0145842 | A1 | 6/2007 | Zhu et al. | |
| 2011/0120073 | A1* | 5/2011 | Flanary | H02K 5/08 56/250 |
| 2011/0318200 | A1* | 12/2011 | Takeshita | F04D 25/0606 417/321 |
| 2012/0139387 | A1* | 6/2012 | Hung | H02K 1/187 310/216.137 |
| 2012/0269666 | A1* | 10/2012 | Lin | F04D 25/064 417/423.7 |
| 2012/0326542 | A1* | 12/2012 | Rojo Lulic | H02K 5/1735 310/90 |
| 2013/0195696 | A1* | 8/2013 | Sugimura | H02K 11/33 417/410.1 |
| 2014/0183983 | A1* | 7/2014 | Huang | H02K 3/28 310/43 |
| 2015/0123501 | A1* | 5/2015 | Jang | H02K 5/225 310/43 |

FOREIGN PATENT DOCUMENTS

| | | | |
|---|---|---|---|
| JP | 2000116089 | * | 4/2000 |
| JP | 2010130847 | A | 6/2010 |
| TW | 200835120 | A | 8/2008 |

OTHER PUBLICATIONS

4 Common Uses for Silicone Glue (Year: 2010).*
Bulk Molding Compound Offers Excellent Flow Characteristics (Year: 2020).*

* cited by examiner

STATOR OF A WATERPROOF MOTOR AND METHOD FOR MANUFACTURING THE SAME

The application claims the benefit of Taiwan application serial No. 107104551, filed on Feb. 8, 2018, and the entire contents of which are incorporated herein by reference.

BACKGROUND OF THE INVENTION

1. Field of the Invention

The present invention generally relates to a component of a motor and a method for manufacturing the component of the motor and, more particularly, to a stator of a waterproof motor and a method for manufacturing the stator of the waterproof motor.

2. Description of the Related Art

Figure 1:
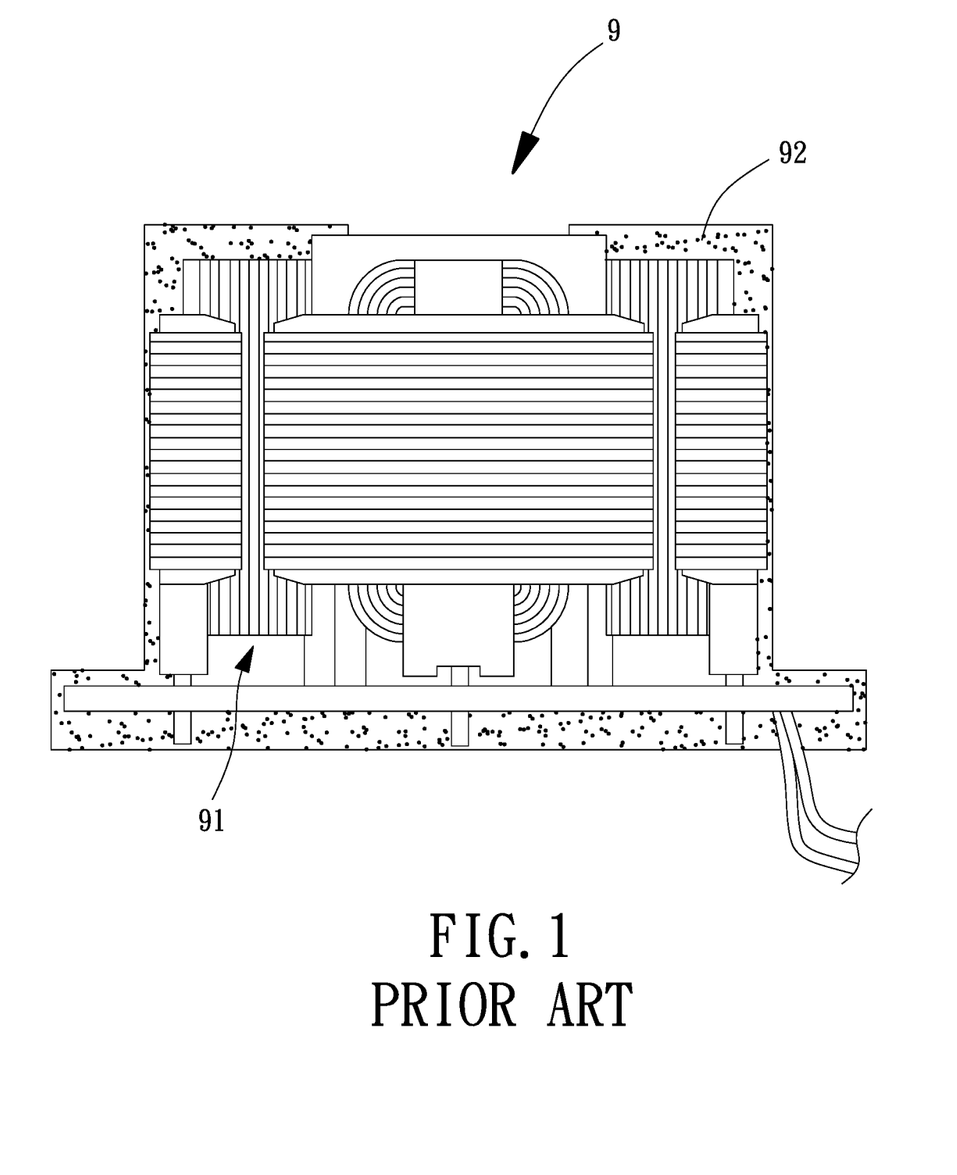
FIG. 1 is a cross sectional view of a stator of a conventional waterproof motor.

FIG. 1 shows a stator 9 of a waterproof motor manufactured by a conventional manufacturing method. The conventional manufacturing method includes forming a stator assembly 91 in a mold, filling the space between the stator assembly 91 and the cavity wall of the mold with a filler, and removing the mold to obtain the stator 9 of the waterproof motor. The stator 9 includes a protective layer 92. An embodiment of such a method for manufacturing a stator of a waterproof motor is disclosed in U.S. Patent Publication No. 2007/0085426 (Taiwan Patent No. 1344253).

Although the conventional manufacturing method can form the protective layer 92 in a single process, the electronic components of the stator assembly 91 are often damaged by the large injection pressure of the thermosetting material which forms the protective layer 92. As a result, it is difficult to increase the yield rate. In another case where the waterproof glue is used as the material of the protective layer 92, it takes dozens of hours to cure the waterproof glue. This requires an extra process of baking the waterproof glue. Disadvantageously, the yield rate is low and the energy consumption is high.

In light of this, it is necessary to improve the conventional method for manufacturing a stator of a waterproof motor.

SUMMARY OF THE INVENTION

It is therefore the objective of this invention to provide a method for manufacturing a stator of a waterproof motor which can lower the damage to the components and reduces the amount of the waterproof glue used.

In an aspect, a method for manufacturing a stator of a waterproof motor includes disposing a first assembly in a mold where the first assembly includes a coil unit wound around an iron core assembly, and filling the mold with a thermosetting plastic which forms a housing after curing. The housing houses the coil unit and the iron core assembly. A recess is formed at one end of the housing. The method further includes disposing a second assembly in the recess of the housing where the second assembly includes a circuit unit, and filling the recess of the housing with a waterproof glue which envelopes the circuit unit after curing. According to the above, the stator of the waterproof motor is formed.

In an example, the method for manufacturing the stator of the waterproof motor further includes coupling the iron core assembly with an outer periphery of a shaft tube of the first assembly before forming the housing. The housing is coupled with the outer periphery of the shaft tube. One end of the shaft tube is not enveloped by the housing and extends into the recess of the housing. Thus, it is ensured that the liquid will not be able to intrude into the gap between the shaft tube and the housing, improving the waterproof effect of the motor.

In the example, disposing the second assembly includes connecting a circuit connector of the circuit unit to a coil connector of the coil unit which is exposed to the recess of the housing, and filling the recess includes enveloping the coil connector of the coil unit and the circuit unit with the waterproof glue. Thus, the waterproof effect and the convenience in assembly are improved.

In the example, the coil unit includes a wire wound around a post of the iron core assembly. A free end of the post extends out of the housing and is exposed to the recess after forming the housing. Disposing the second assembly includes disposing a circuit board of the circuit unit in the recess of the housing and engaging the circuit board of the circuit unit with the post of the iron core assembly, and filling the recess includes enveloping the post and the circuit board with the waterproof glue. Thus, the waterproof effect and the convenience in assembly are improved.

In another aspect, a method for manufacturing a stator of a waterproof motor includes disposing a first assembly in a mold where the first assembly includes a coil unit wound around an iron core assembly, positioning a second assembly in an electric box which includes a circuit unit, and filling the mold with a thermosetting plastic which forms a housing after curing. The housing houses the coil unit and the iron core assembly. A recess is formed at one end of the housing. A retaining ring forms at a circumferential edge of the recess. The method further includes filling the electric box with a waterproof glue which envelopes the circuit unit after curing, and engaging the electric box with the housing to press the retaining ring against the waterproof glue. According to the above, the stator of the waterproof motor is formed.

In an example, engaging the electric box includes connecting a circuit connector of the circuit unit, which is exposed out of the waterproof glue, to a coil connector of the coil unit which is exposed out of the housing before pressing the retaining ring against the waterproof glue. Thus, the waterproof effect and the convenience in assembly are improved.

In the example, the thermosetting plastic is bulk molding compound (BMC) and the waterproof glue is polyurethane (PU) or silicone glue. Thus, the quality of the waterproof motor is improved.

In a further aspect, a stator of a waterproof motor includes a first assembly having a coil unit wound around an iron core assembly, a housing made of thermosetting plastic and enveloping the coil unit and the iron core assembly where a recess is formed at one end of the housing, and a second assembly disposed in the recess of the housing and including a circuit unit. The recess is filled with a waterproof glue which envelops the circuit unit.

In an example, the first assembly includes a shaft tube and the iron core assembly is coupled with an outer periphery of the shaft tube. The housing is coupled with the outer periphery of the shaft tube. One end of the shaft tube is not enveloped by the housing and extends into the recess. Thus, it is ensured that the liquid will not be able to intrude into the gap between the shaft tube and the housing, improving the waterproof effect of the motor.

In the example, the coil unit includes a coil connector exposed to the recess of the housing and connected to a circuit connector of the circuit unit, and the waterproof glue envelopes the coil connector of the coil unit and the circuit unit. Thus, the waterproof effect and the convenience in assembly are improved.

In the example, the second assembly includes a support coupled with the shaft tube and located in the recess of the housing, and the circuit unit includes a circuit board coupled with the support. Thus, the circuit board can be securely positioned in the recess of the housing.

In the example, a shoulder portion is provided on the outer periphery of the shaft tube. The housing includes an axial extension portion abutting the outer periphery of the shaft tube and extending into the recess of the housing. A free end of the axial extension portion abuts the shoulder portion. The support is connected to the axial extension portion. Thus, the reliability in engagement between the housing and the shaft tube is improved.

In the example, the iron core assembly includes a post having a free end extending out of the housing and exposed to the recess. The coil unit includes a wire wound around the post of the iron core assembly. The circuit unit includes a circuit board located in the recess of the housing and engaged with the post of the iron core assembly. The waterproof glue envelopes the post and the circuit board. Thus, the convenience in assembly is improved.

In still a further aspect, a stator of a waterproof motor includes a first assembly having a coil unit wound around an iron core assembly, a second assembly including a circuit unit, and a housing made of thermosetting plastic and enveloping the coil unit and the iron core assembly. A recess is formed at one end of the housing. A retaining ring forms at a circumferential edge of the recess. The stator of the waterproof motor further includes an electric box receiving the second assembly and filled with a waterproof glue to envelope the circuit unit with the waterproof glue. The electric box and the housing are coupled with each other. The retaining ring is pressed against the waterproof glue.

In an example, the coil unit includes a coil connector exposed out of the housing and connected to a circuit connector of the circuit unit which is exposed out of the waterproof glue, and the coil connector of the coil unit is connected to the circuit connector of the circuit unit in an inner space delimited by an inner periphery of the retaining ring. Thus, the waterproof effect and the convenience in assembly are improved.

In the example, a rotor space is formed at a center of the housing, and the housing includes a shaft-coupling portion located in the rotor space. Thus, the convenience in assembly is improved.

In the example, the housing includes a plurality of screwing portions surrounding the retaining ring and screwed to a plurality of screwing portions of the electric box. Thus, the waterproof effect is improved.

In the example, the plurality of screwing portions of the housing is located outside the waterproof glue. Thus, it can prevent the fasteners from damaging the waterproof glue.

In the example, a wire groove is provided surrounding an outer periphery of the retaining ring. The wire groove is not intercommunicating with an inner space delimited by an inner periphery of the retaining ring. The circuit unit includes a wire connected to a circuit board. A portion of the wire that is connected to the circuit board is enveloped by the waterproof glue. The wire is partially exposed out of the waterproof glue and extends out of the housing through the wire groove. Thus, the waterproof glue can prevent the wire from breaking somewhere around the circuit board and prevent the liquid from permeating into the inner space of the retaining ring when the wire is being pulled out of the housing. As a result, the convenience in connecting the wire to an external power supply and the waterproof effect are improved.

Based on the above, the stator of the waterproof motor and the method for manufacturing the same can significantly reduce the amount of the waterproof glue used. Thus, the yield rate and quality of the product as well as the production efficiency are improved while the manufacturing cost is reduced.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

A method for manufacturing a stator of a waterproof motor according to a first embodiment of the invention includes the steps described as follows.

Figure 2:
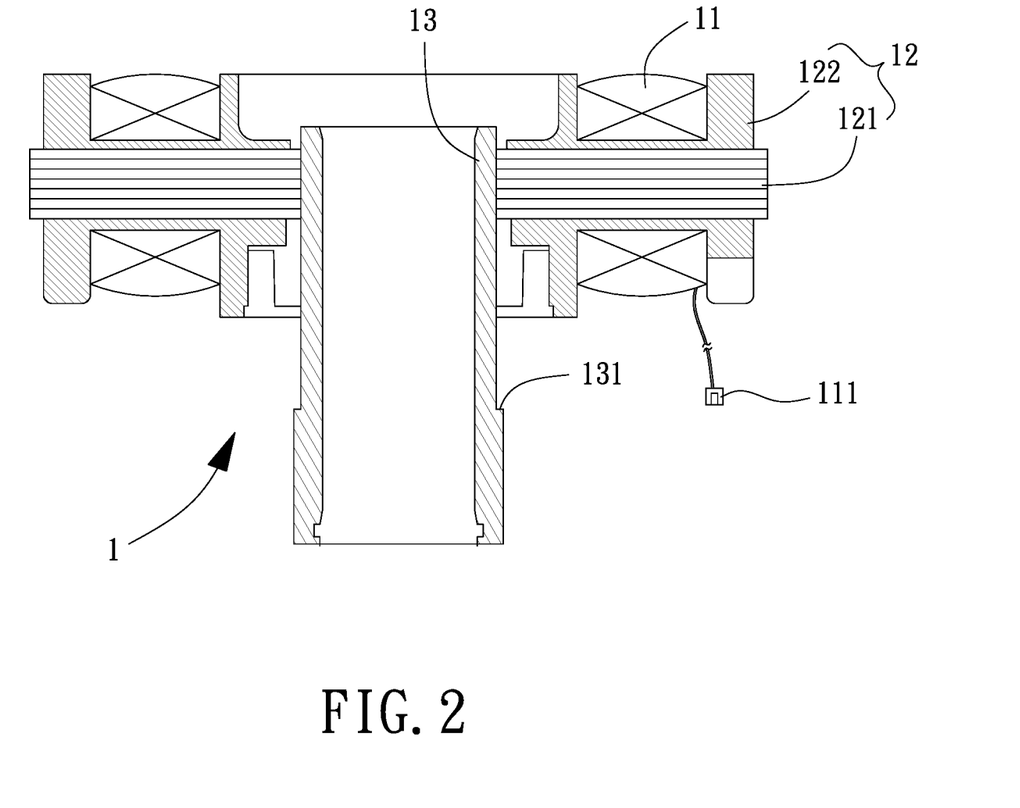
FIG. 2 is a cross sectional view of a first assembly of a stator of a waterproof motor according to a first embodiment of the invention.

Referring to FIG. 2, the method for manufacturing the stator of the waterproof motor includes disposing a first assembly 1 in a mold (not shown). The first assembly 1 at least includes a coil unit 11 wound around an iron core assembly 12. In this embodiment, the iron core assembly 12 includes a plurality of silicon steel plates 121 and an insulating sleeve unit 122. The silicon steel plates 121 are stacked together and are clamped by the insulating sleeve unit 122. The coil unit 11 is radially wound around the insulating sleeve unit 122.

Figure 3:
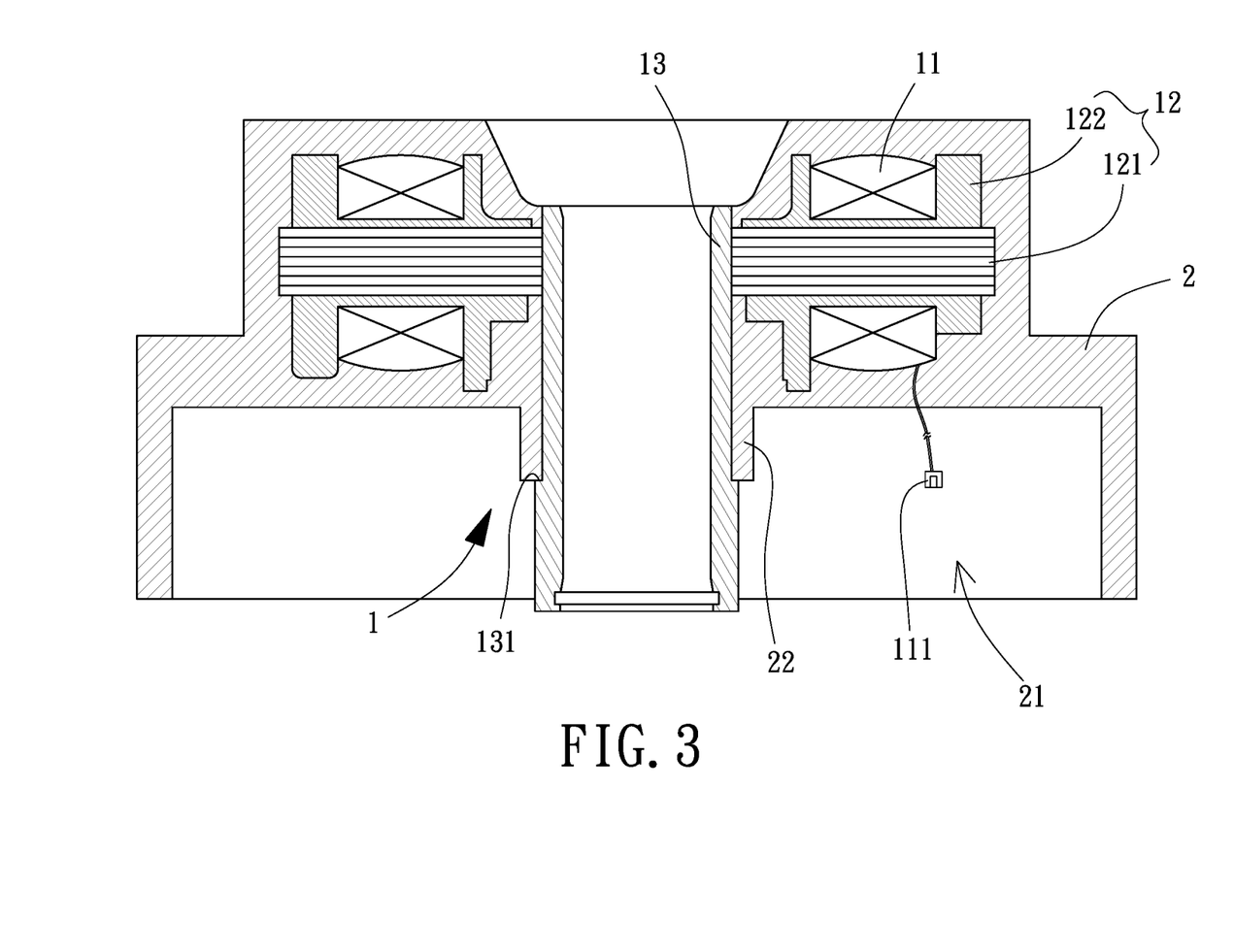
FIG. 3 is a cross sectional view of a housing and the first assembly of FIG. 2.

Referring to FIG. 3, the method for manufacturing the stator of the waterproof motor further includes filling the mold with a thermosetting plastic. The thermosetting plastic forms a housing 2 which envelopes the coil unit 11 and the iron core assembly 12 after curing. A recess 21 is formed at one end of the housing 2. The thermosetting plastic may be epoxy resin. Preferably, the thermosetting plastic is thermosetting plastic formed by injecting molding, such as bulk molding compound (BMC). The bulk molding compound is lightweight and has a high strength and a low shrinkage rate. The bulk molding compound is highly temperature resistant and moisture-resistant. The bulk molding compound permits the mold removal at an angle of 0 degree. This improves not only the formation rate and formation efficiency of the housing 2 but also the quality of the produced waterproof motor.

Referring to both FIGS. 2 and 3 again, it is worth mentioning that the first assembly 1 in this embodiment preferably includes a shaft tube 13. Before the formation of the housing 2, the iron core assembly 12 can be fixed to the outer periphery of the shaft tube 13 to couple the housing 2 to the outer periphery of the shaft tube 13 after the housing 2 cures. At the same time, one end of the shaft tube 13 is not enveloped by the housing 2 and protrudes into the recess 21. In this arrangement, the watertight effect between the shaft tube 13 and the housing 2 is improved, ensuring that the liquid will not be able to intrude into the gap between the shaft tube 13 and the housing 2. Furthermore, a shoulder portion 131 may be provided on the outer periphery of the shaft tube 13. Thus, during the formation of the housing 2, the housing 2 can form an axial extension portion 22 abutting the outer periphery of the shaft tube 13 and extending into the recess 21. A free end of the axial extension portion 22 abuts the shoulder portion 131 of the shaft tube 13. As a result, the convenience in positioning the shaft tube 13 in the mold is improved, thereby forming the housing 2. In addition, the arrangement of the axial extension portion 22 increases the contact area between the housing 2 and the shaft tube 13, thus providing a more reliable engagement effect between the housing 2 and the shaft tube 13.

Figure 4:
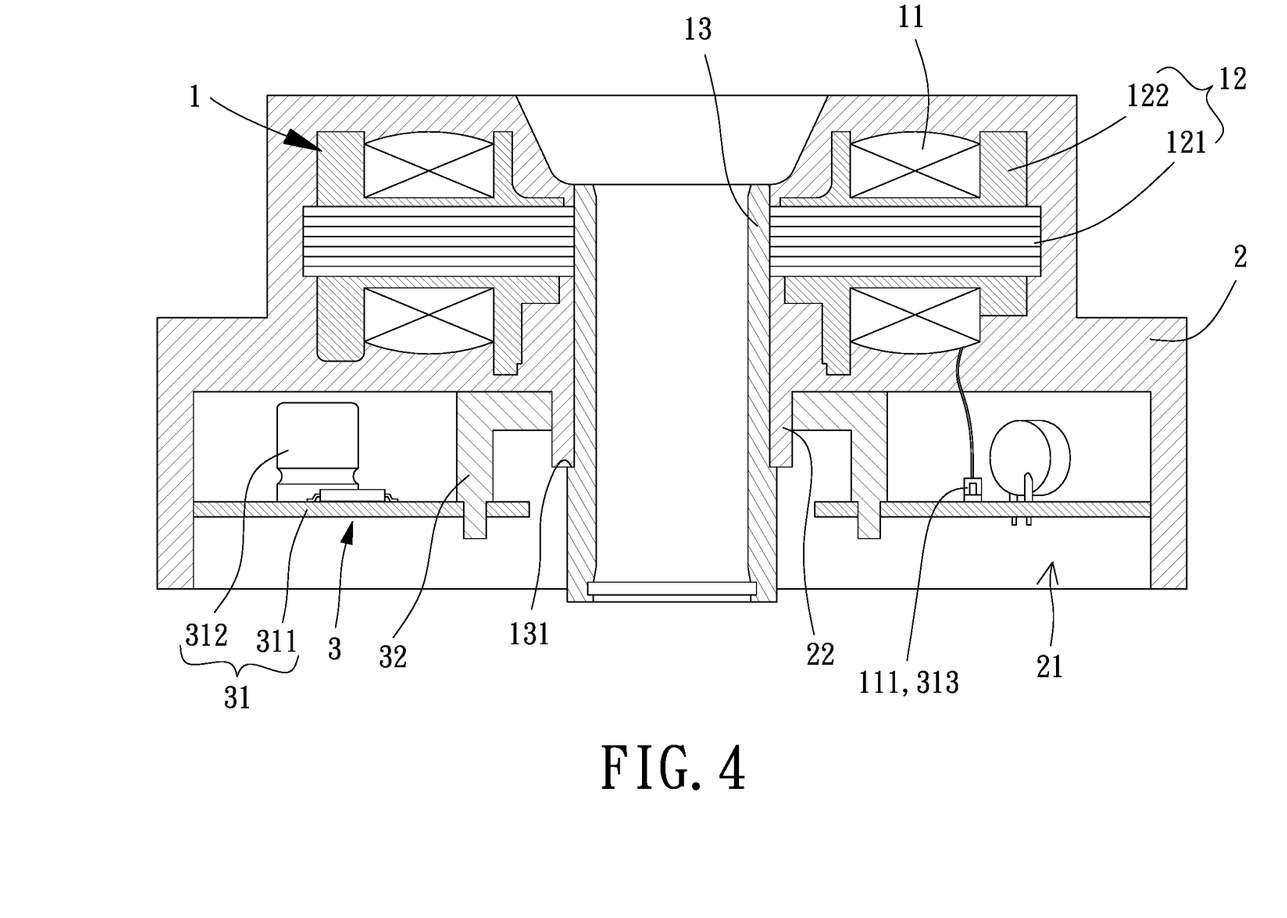
FIG. 4 is a cross sectional view of a second assembly and the housing and the first assembly of FIG. 3.

Referring to FIG. 4, the method further includes positioning a second assembly 3 in the recess 21 of the housing 2. The second assembly 3 includes at least a circuit unit 31. The circuit unit 31 may include a circuit board 311 and a plurality of electronic components 312 mounted on the circuit board 311. In this embodiment, the second assembly 3 may further include a support 32. After the formation of the housing 2, the support 32 can be coupled with the axial extension portion 22 of the housing 2, such that the support 32 is fixed to the outer periphery of the shaft tube 13 and is located in the recess 21 of the housing 2. Then, the circuit board 311 of the circuit unit 31 is coupled with the support 32 such that the circuit board 311 can be stably positioned in the recess 21. In another embodiment, the support 32 can be formed at the time the housing 2 is formed. In other words, the support 32 and the housing 2 are integrally formed with each other.

Figure 5:
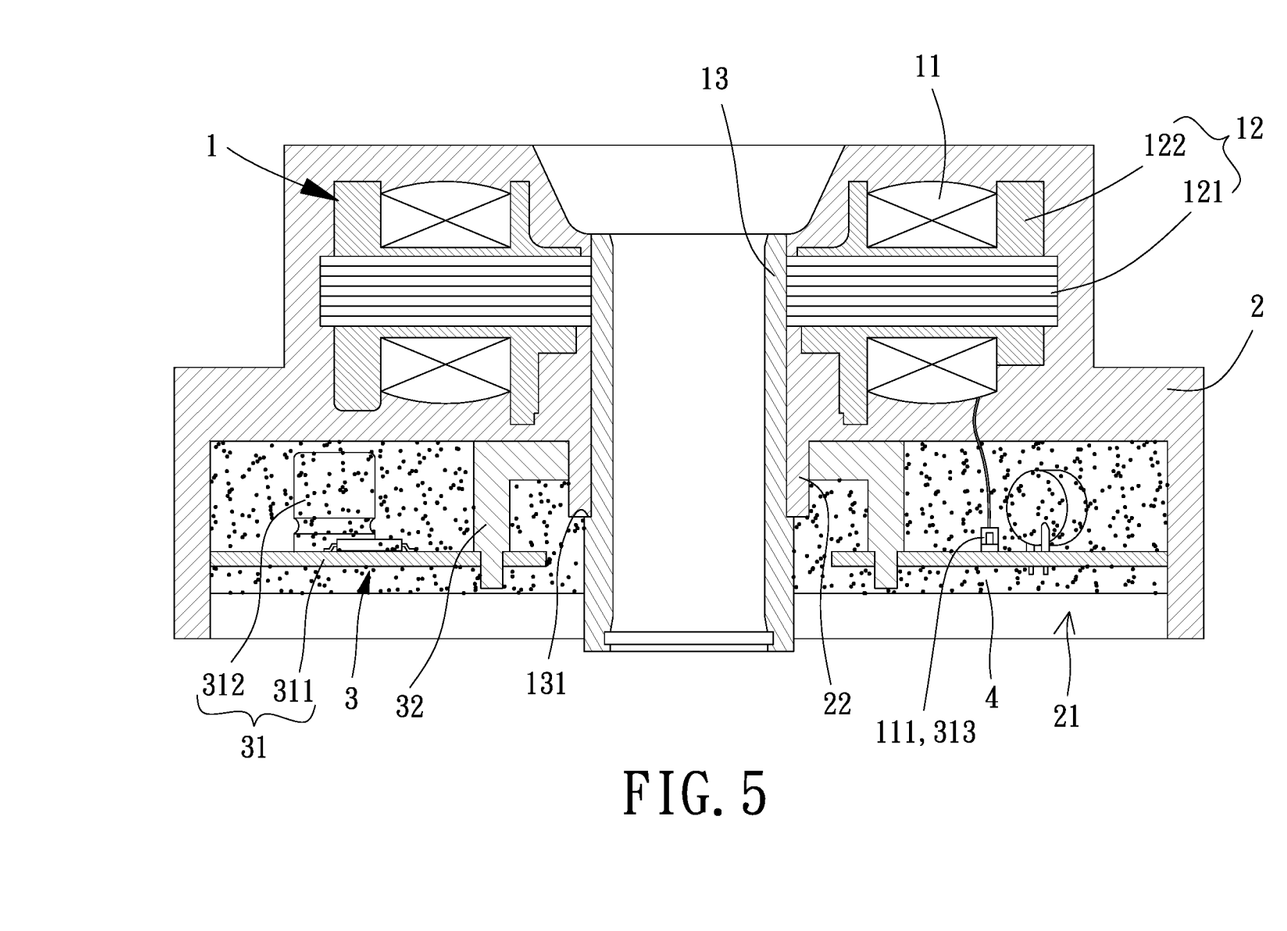
FIG. 5 is a cross sectional view of the stator of the first embodiment filled with a waterproof glue.

Referring to FIG. 5, the method further includes filling the recess 21 with a waterproof glue 4 to envelope the circuit unit 31, thus obtaining the stator of the waterproof motor of the first embodiment of the invention. The waterproof glue 4 may be polyurethane (PU) or silicone glue.

Referring to FIGS. 4 and 5 again, the coil unit 11 of the first assembly 1 may include a coil connector 111. During the formation of the housing 2, the housing 2 may not envelope the coil connector 111 such that the coil connector 111 is exposed to the recess 21. In this regard, the circuit unit 31 includes a circuit connector 313 connected to the circuit board 311. Therefore, when the second assembly 3 is positioned in the recess 21, the coil connector 111 of the coil unit 11 can be connected to the circuit connector 313 of the circuit unit 31. Then, the recess 21 is filled with the waterproof glue 4 to envelope the coil, connector 111 of the coil unit 11 and the entire circuit unit 31. In another embodiment, the wire of the coil unit 11 can be directly welded to the circuit board 311 to electrically connect the coil unit 11 to the circuit board 311.

Referring to FIG. 5, based on the above process, the method for manufacturing the stator of the waterproof motor according to the first embodiment of the invention can achieve at least the advantages of improved yield rate, improved quality, improved production efficiency and higher production capacity, and reduced manufacturing cost.

With respect to the first advantage (improved yield rate), the manufacturing method of the invention envelopes the fragile parts of the motor with the waterproof glue 4 that has a relatively smaller filling pressure, and envelopes the strong parts of the motor with a thermosetting plastic that has a relatively larger injection pressure. In this manner, there are hardly components damaged during the formation of the waterproof structure, significantly improving the yield rate of the product.

With respect to the second advantage (improved quality), under the high yield rate stated above, the manufacturing method of the invention permits the thermosetting plastic to fill the tiny gaps inside the mold based on the high flowability of the thermosetting plastic. Thus, the thermosetting plastic can completely envelope those parts of the first assembly 1 which requires sealing, thereby providing the first assembly 1 with excellent insulating function and waterproof function. As a result, higher yield rate and product quality are attained.

With respect to the third advantage (improved production efficiency and higher production capacity), the majority part of the stator of the waterproof motor can be enveloped by the thermosetting plastic while the minority part of the stator which is more easily broken is enveloped by the waterproof glue 4. Thus, the amount of the waterproof glue 4 as required is significantly reduced. Following the injection molding, the bulk molding compound (BMC) can cure almost as soon as the mold is removed, thereby reducing the amount of the waterproof glue 4 used and significantly shortening the time it takes for the waterproof glue 4 to cure. Advantageously, the method for manufacturing the stator of the waterproof motor according to the invention can significantly improve the production efficiency and the production capacity.

With respect to the fourth advantage (reduced manufacturing cost), the method for manufacturing the stator of the waterproof motor according to the invention can significantly reduce the amount of the waterproof glue 4 used and reduce the energy required to bake the waterproof glue 4. As a result, the manufacturing cost is lowered. It is noted that the method according to the invention no longer requires a fixture that is needed for filling purpose of the waterproof glue 4 as the recess 21 is formed during the formation of the housing 2 for filling purpose of the waterproof glue 4. Thus, the expenses resulting from bulk purchase, maintenance and warehousing of the fixtures are not incurred.

Referring to FIG. 5, the stator of the waterproof motor according to the first embodiment of the invention can be obtained based on the above manufacturing method. The stator includes a first assembly 1, a housing 2, a second assembly 3 and a waterproof glue 4. The first assembly 1 at least includes a coil unit 11 wound around the iron core assembly 12. The housing 2 envelops the coil unit 11 and the iron core assembly 12. A recess 21 is formed at one end of the housing 2. The second assembly 3 is positioned in the recess 21. The second assembly 3 includes at least a circuit unit 31. The waterproof glue 4 fills the recess 21 and envelops the circuit unit 31.

The first assembly 1 preferably further includes a shaft tube 13. The iron core assembly 12 is fixed to the outer periphery of the shaft tube 13. The housing 2 is coupled with the outer periphery of the shaft tube 13. One end of the shaft tube 13 is not enveloped by the housing 2 and extends into the recess 21. In this embodiment, the second assembly 3 includes a support 32 fit around the shaft tube 13 and located in the recess 21 of the housing 2. The circuit unit 31 includes a circuit board 311 coupled with the support 32 such that the circuit board 311 can be stably positioned in the recess 21. A shoulder portion 131 is provided on the outer periphery of the shaft tube 13. The housing 2 includes an axial extension portion 22 abutting the outer periphery of the shaft tube 13 and extending into the recess 21 of the housing 2. A free end of the axial extension portion 22 abuts the shoulder portion 131. The support 32 is integrally formed with or connected to the axial extension portion 22. The coil unit 11 includes a coil connector 111 exposed to the recess 21 of the housing 2 and connected to a circuit connector 313 of the circuit unit 31. The waterproof glue 4 envelops the coil connector 111 of the coil unit 11 and the circuit unit 31.

Figure 6:
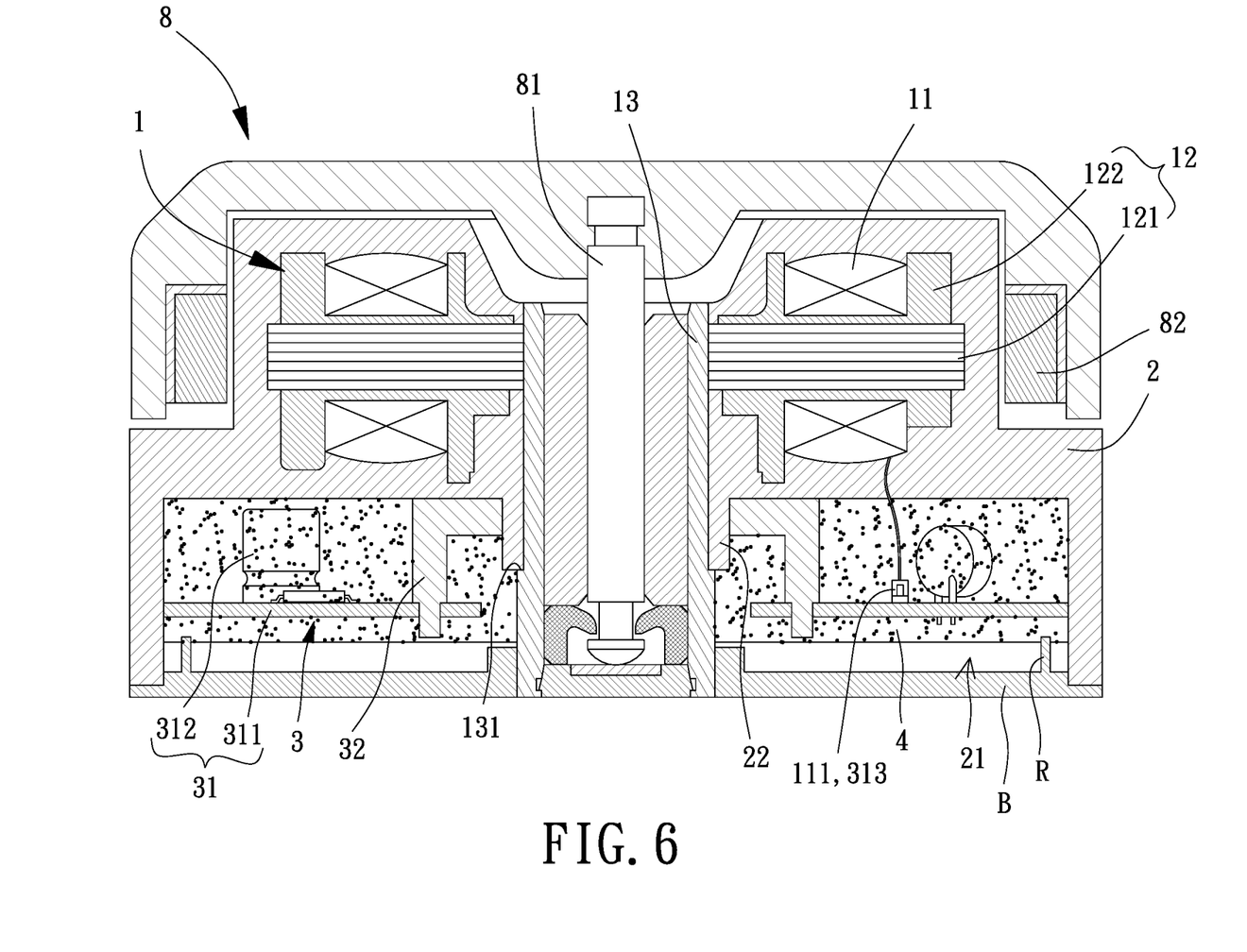
FIG. 6 is a cross sectional view of the stator of the first embodiment which is coupled with a rotor.

Referring to FIG. 6, a rotor 8 includes a shaft 81 rotatably coupled with the shaft tube 13 of the stator of the waterproof motor according to the first embodiment of the invention. In this regard, a magnet 82 faces the iron core assembly 12. After the stator is electrified to generate a magnetic field, the rotor 8 is driven to rotate. Besides, a seat B includes a retaining ring R. The seat B is coupled with the shaft tube 13 while the retaining ring R is pressed against the waterproof glue 4.

Figure 7:
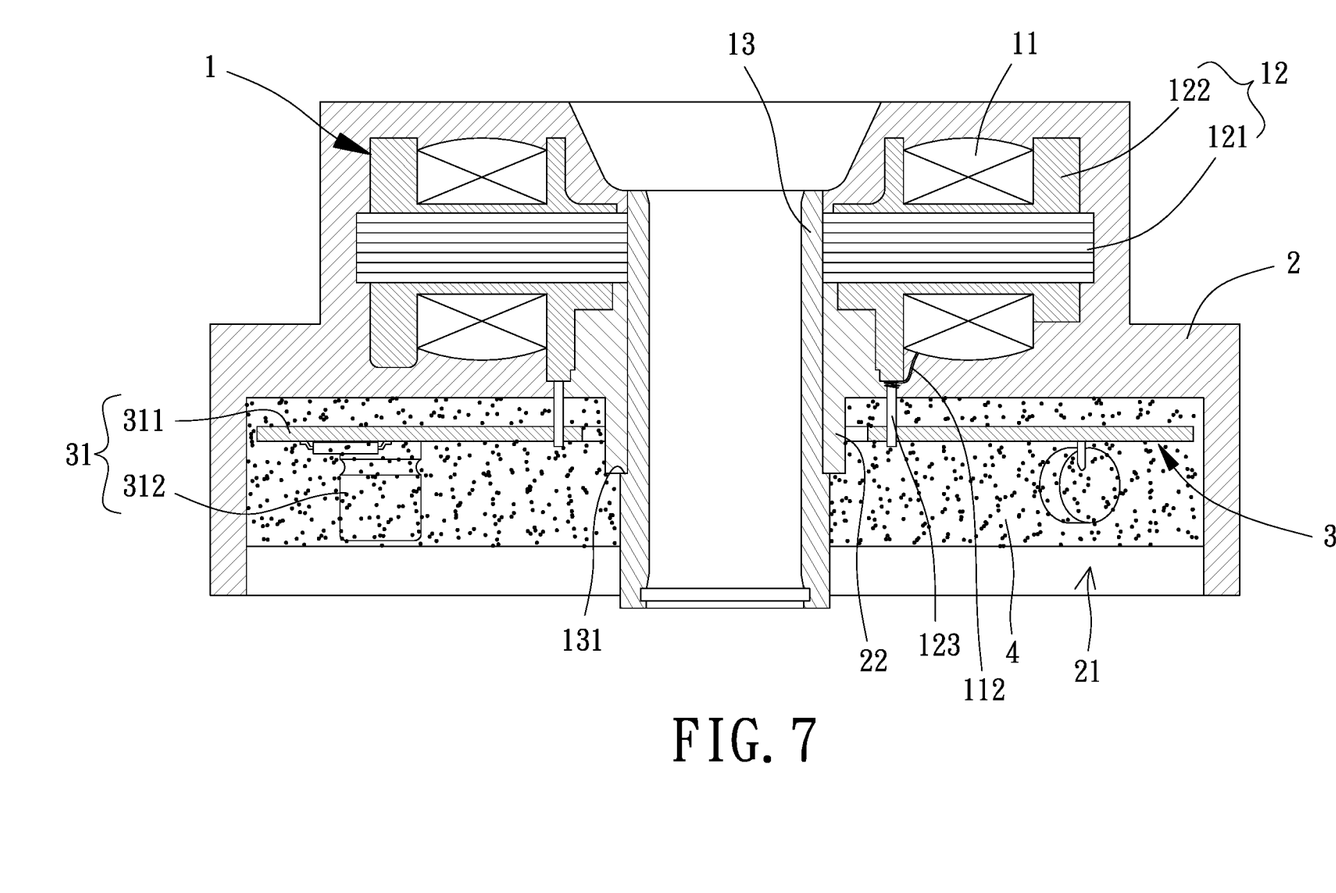
FIG. 7 is a cross sectional view of a stator of a waterproof motor according to a second embodiment of the invention.

FIG. 7 shows a stator of a waterproof motor as manufactured by a manufacturing method according to a second embodiment of the invention. The stator of the waterproof motor in FIG. 7 is substantially the same as that of the first embodiment except for the manner the second assembly 3 is positioned in the recess 21 of the housing 2.

Specifically, the iron core assembly 12 of the first assembly 1 in this embodiment includes a post 123. The post 123 is an electrically conductive post on the insulating sleeve unit 122. A wire 112 of the coil unit 11 is wound around the coil unit 11. After the housing 2 is shaped, the portion of the post 123 that is wound with the wire 112 is preferably enveloped by the housing 2 while the free end of the post 123 extends out of the housing 2 and is exposed to the recess 21. After the second assembly 3 is disposed in the recess 21, the post 123 extends through and couples with the circuit board 311 of the circuit unit 31 to simplify the assembly of the second assembly 3. Then, the recess 21 is filled with the waterproof glue. 4 to envelop the post 123 and the circuit unit 31 in the waterproof glue 4. In this manner, the stator of the waterproof motor according to the second embodiment of the invention can be obtained and can possess the same advantages as the manufacturing method of the first embodiment of the invention.

A method for manufacturing a stator of a waterproof motor according to a third embodiment of the invention includes the steps described as follows.

Figure 8:
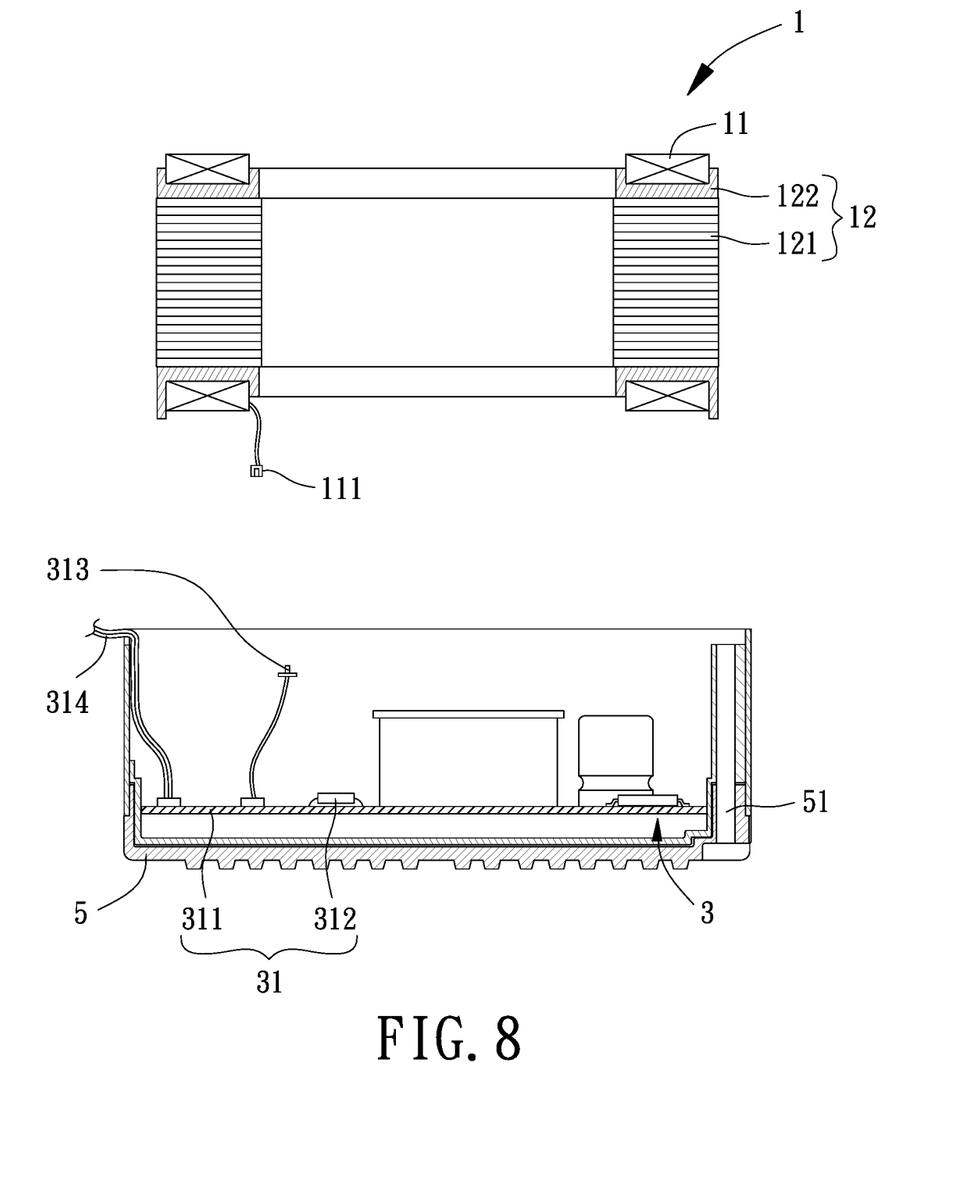
FIG. 8 is a cross sectional view of a first assembly and an electric box of a stator of a waterproof motor according to a third embodiment of the invention.

Referring to FIG. 8, the method for manufacturing the stator of the waterproof motor includes disposing a first assembly 1 in a mold (not shown). The first assembly 1 at least includes a coil unit 11 wound around an iron core assembly 12. In this embodiment, the iron core assembly 12 includes a plurality of silicon steel plates 121 and an insulating sleeve unit 122 (including two insulating sleeves). The silicon steel plates 121 are stacked together and are clamped by the insulating sleeve unit 122. The coil unit 11 is radially wound around the insulating sleeve unit 122.

Besides, the second assembly 3 is positioned in an electric box 5. The electric box 5 includes at least a circuit unit 31 having a circuit board 311 and a plurality of electronic components 312 mounted on the circuit board 311.

Figure 9:
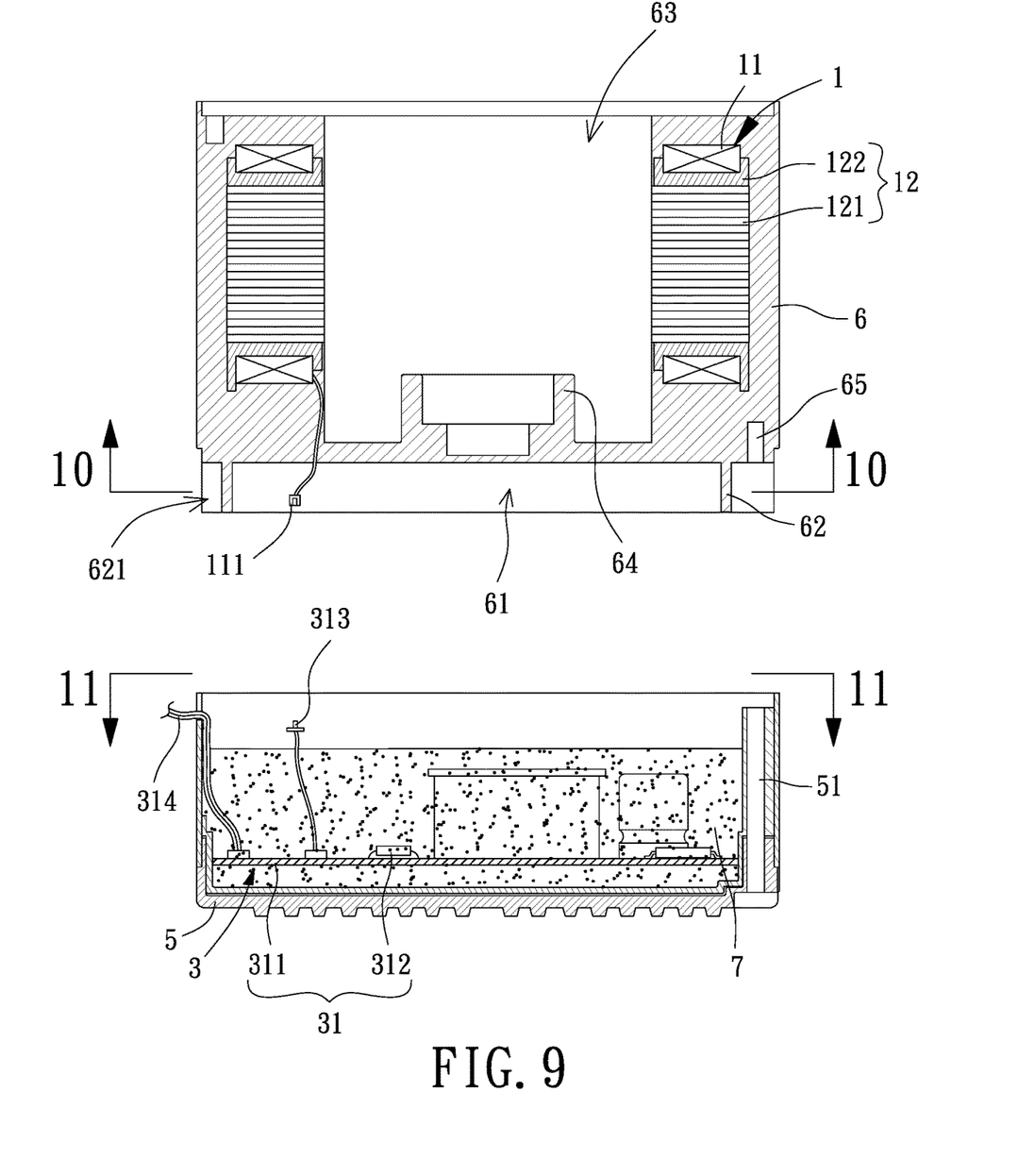
FIG. 9 is a cross sectional view of the stator of the waterproof motor of the third embodiment where the electric box is filled with a waterproof glue and a housing is formed.

Referring to FIG. 9, the mold is filled with the thermosetting plastic which forms a housing 6 after curing. The coil unit 11 and the iron core assembly 12 are enveloped by the housing 6. A recess 61 is formed at one end of the housing 6. A retaining ring 62 forms near a circumferential edge of the recess 61. The thermosetting plastic may be epoxy, or preferably be thermosetting plastic formed by injection molding such as bulk molding compound (BMC).

The electric box 5 is filled with the waterproof glue 7 to envelop the circuit unit 31 in the waterproof glue 7 (in a manner where at least the electrically conductive parts of the circuit unit 31 are enveloped by the waterproof glue 7). The waterproof glue 7 may be polyurethane (PU) or silicone glue.

Figure 12:
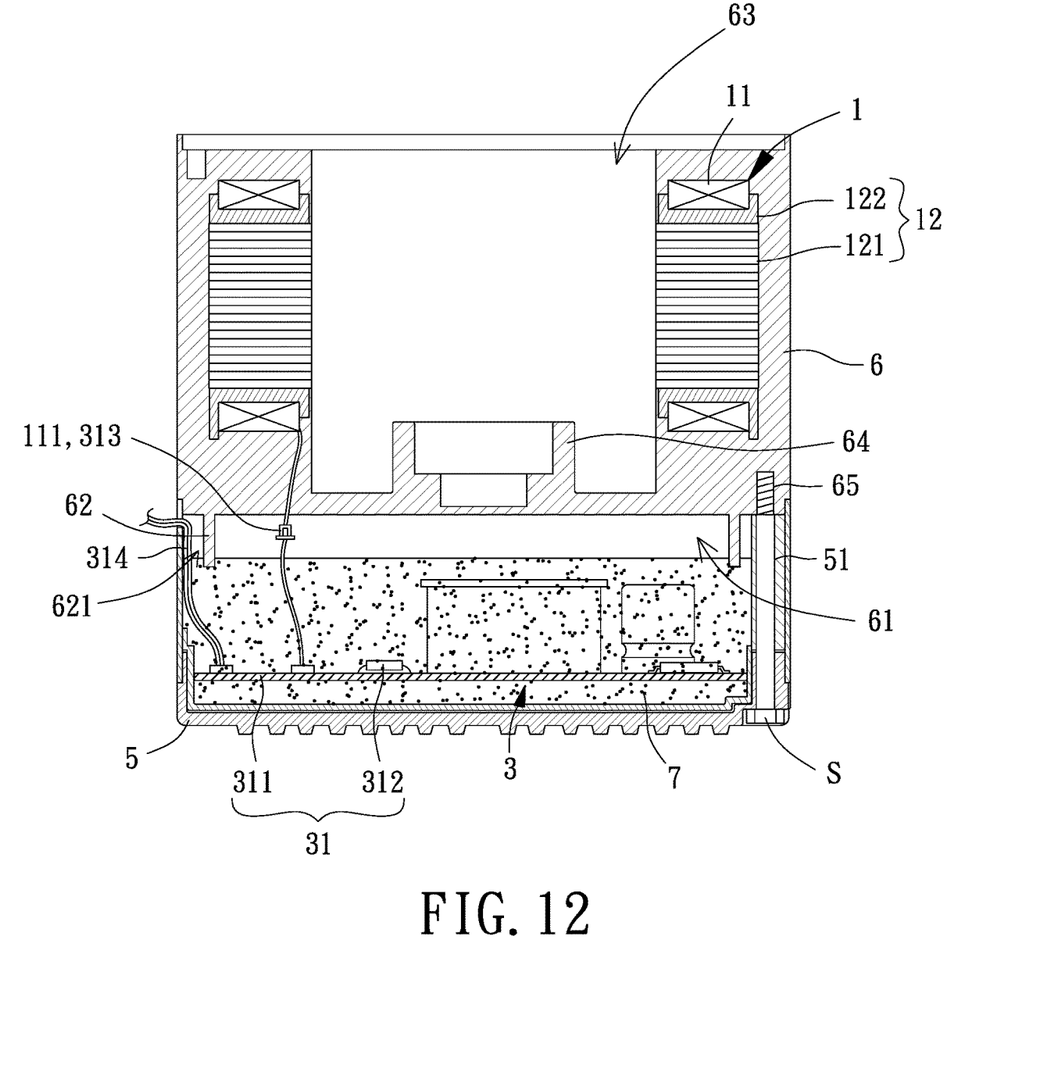
FIG. 12 is an assembled, cross sectional view of the stator of the waterproof motor according to the third embodiment of the invention.

Referring to FIG. 12, the electric box 5 and the housing 6 are coupled with each other such that the retaining ring 62 is pressed against the waterproof glue 7. Accordingly, the stator of the waterproof motor according to the third embodiment of the invention is obtained. When the retaining ring 62 is pressed against the waterproof glue 7, the waterproof glue 7 can deform under the force to close up the opening of the retaining ring 62. This ensures that the liquid will not intrude into the inner space delimited by the inner periphery of the retaining ring 62.

Referring to FIGS. 9 and 12 again, it is noted that the coil unit 11 of the first assembly 1 includes a coil connector 111, which is exposed out of the housing 6 after the formation of the housing 6. The circuit unit 31 includes a circuit connector 313 exposed out of the waterproof glue 7. In this arrangement, during the assembly of the electric box 5 and the housing 6, the circuit connector 313 of the circuit unit 31 can be connected to the coil connector 111 of the coil unit 11 and then the retaining ring 62 is pressed against the waterproof glue 7.

Based on the above steps, the method for manufacturing the stator of the waterproof motor according to the third embodiment of the invention can achieve the same advantage as the first embodiment. It is noted that the waterproof glue 7 is filled into the electric box 5 such that it will not incur the costs of purchase, maintenance and warehousing of the fixtures required for filling purposes of the waterproof glue 7. Moreover, the retaining ring 62 can be formed during the formation of the housing 6, thus omitting the use of a washer (such as an O-ring) during the assembly of the electric box 5 and the housing 6. In this arrangement, it can be ensured that the liquid will not intrude into the inner space of the waterproof motor, simplifying the structure and improving the efficiency in assembly of the waterproof motor.

Referring to FIG. 12, based on the manufacturing method according to the third embodiment of the invention, the stator of the waterproof motor of the third embodiment can be obtained. The stator includes a first assembly 1, a second assembly 3, a housing 6, an electric box 5 and a waterproof glue 7. The first assembly 1 at least includes a coil unit 11 wound around an iron core assembly 12. The second assembly 3 includes at least a circuit unit 31. The housing 6 is made of thermosetting plastic and envelops the coil unit 11 and the iron core assembly 12. A recess 61 is formed at one end of the housing 6. A retaining ring 62 forms at a circumferential edge of the recess 61. The second assembly 3 is disposed in the electric box 5. The waterproof glue 7 fills the inner space of the electric box 5 to envelope the circuit unit 31 (in a manner where at least the electrically conductive parts of the circuit unit 31 are enveloped by the waterproof glue 7). The electric box 5 is coupled with the housing 6 while the retaining ring 62 of the housing 6 is pressed against the waterproof glue 7.

Figure 13:
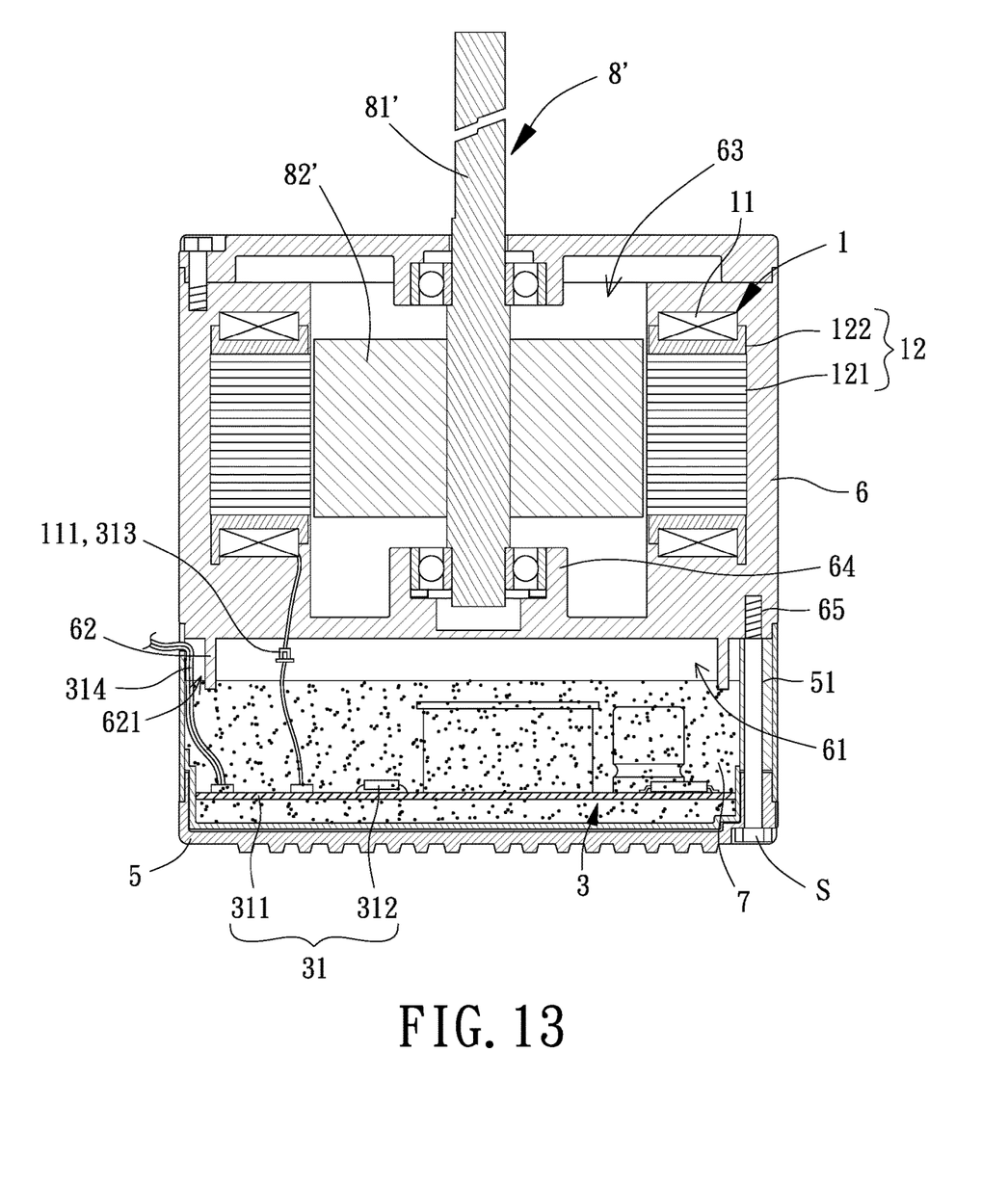
FIG. 13 is a cross sectional view of the stator of the third embodiment which is coupled with a rotor.

The coil unit 11 includes a coil connector 111 exposed out of the housing 6. The circuit unit 31 includes a circuit connector 313 exposed out of the waterproof glue 7. The coil connector 111 of the coil unit 11 is connected to the circuit connector 313 of the circuit unit 31 in the inner space delimited by the inner periphery of the retaining ring 62. A rotor space 63 is formed at the center of the housing 6. The housing 6 further includes a shaft-coupling portion 64 located in the rotor space 63. Accordingly, referring to FIG. 13, a rotor 8' can be rotatably coupled with the shaft-coupling portion 64 via a shaft 81'. Therefore, a magnet 82' which surrounds the shaft 81' can be located in the rotor space 63 and is radially aligned with the iron core assembly 12. In this arrangement, the stator of the waterproof motor is electrified to generate a magnetic field, driving the rotor 8' to rotate.

Figure 10:
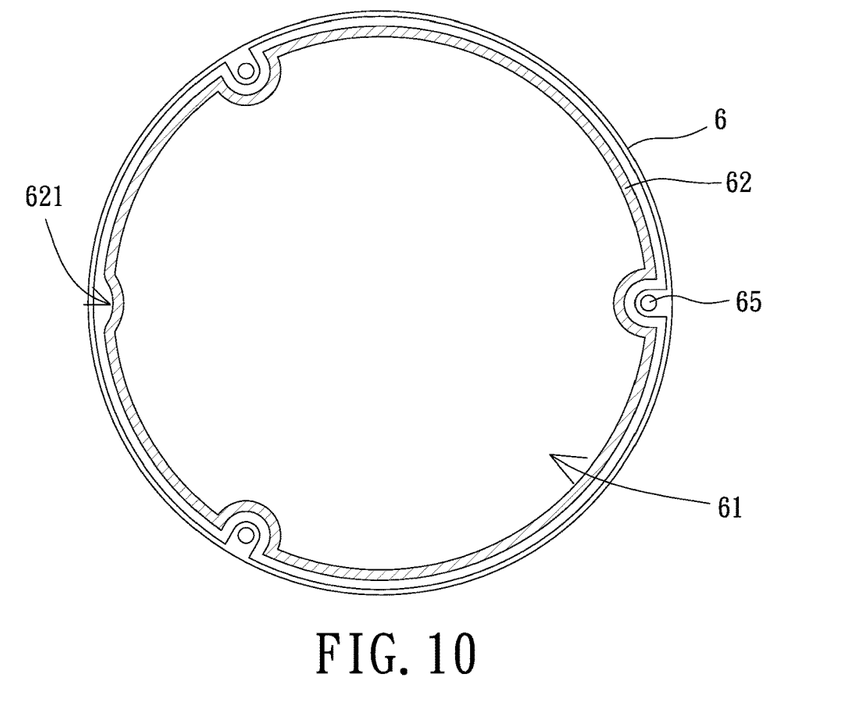
FIG. 10 is a longitudinal cross sectional view of the housing and the first assembly of the stator taken along line 10-10 of FIG. 9.

Specifically, referring to FIGS. 10 and 12, the electric box 5 includes a plurality of screwing portions 51 and the housing 6 also includes a plurality of screwing portions 65. A fastener S can be screwed through a corresponding pair of the screwing portions 51 and 65. As the liquid will inevitably intrude into the inner space of the motor through the screwing portions 51 and 65, the plurality of screwing portions 65 preferably surrounds the retaining ring 62. In this arrangement, although the liquid can permeate into the plurality of screwing portions 51 and the plurality of screwing portions 65, the liquid cannot permeate further into the inner space delimited by the inner periphery of the retaining ring 62 as the retaining ring 62 is pressed against the waterproof glue 7. Thus, the waterproof effect of the stator of the motor is improved.

A wire groove 621 is provided surrounding the outer periphery of the retaining ring 62. The wire groove 621 is not intercommunicating with the inner periphery of the retaining ring 62. The circuit unit 31 includes a wire 314 connected to the circuit board 311. The portion of the wire 314 that is connected to the circuit board 311 is enveloped by the waterproof glue 7. The wire 314 is partially exposed out of the waterproof glue 7 and extends out of the housing 6 through the wire groove 621, so as to connect to an external power supply. In this arrangement, the waterproof glue 7 can prevent the wire 314 from breaking somewhere around the circuit board 311 and prevent the liquid from permeating into the inner space of the retaining ring 62 when the wire 314 is being pulled out of the housing 6.

Figure 11:
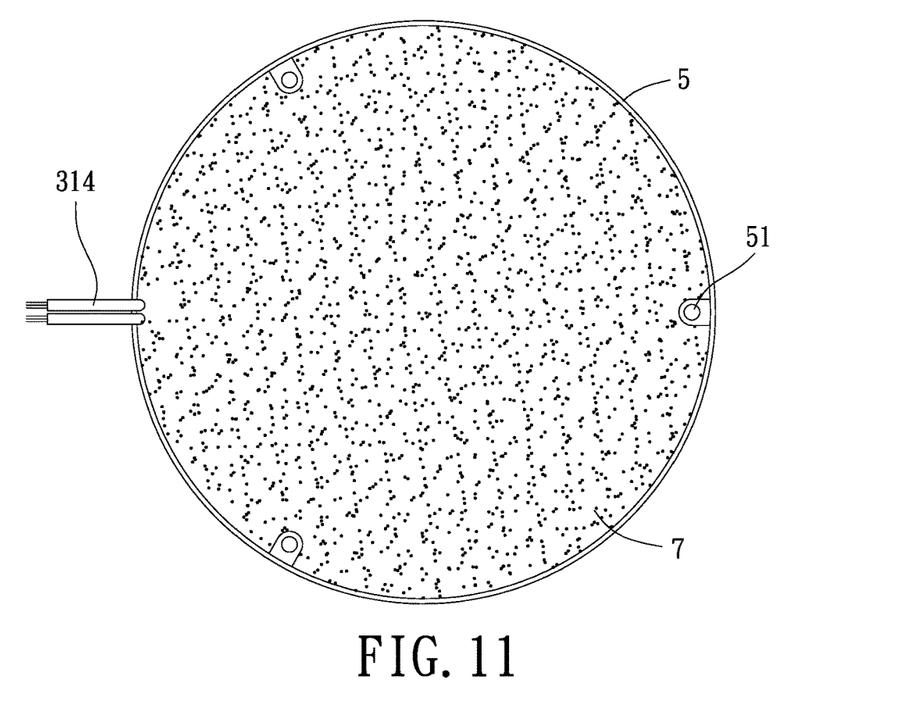
FIG. 11 is a top view of a circuit unit and the electric box of the stator taken along line 11-11 of FIG. 9.

Referring to FIGS. 11 and 12, the plurality of screwing portions 51 of the electric box 5 may be outside of the range of the waterproof glue 7, preventing the fastener S from breaking the waterproof glue 7 which adversely affects the waterproof effect of the stator of the motor.

In summary, the stator of the waterproof motor and the method for manufacturing the same can reduce the damage to the electronic components and significantly lowers the amount of the waterproof glue used. Thus, the yield rate and quality of the product as well as the production efficiency are improved while the manufacturing cost is reduced.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A method of manufacturing a stator of a waterproof motor, comprising:
   disposing a first assembly in a mold, wherein the first assembly includes a coil unit wound around an iron core assembly which couples with an outer periphery of a shaft tube of the first assembly;
   filling the mold with a thermosetting plastic which forms a housing after curing, wherein the housing envelops the coil unit and the iron core assembly, wherein the housing is coupled with the outer periphery of the shaft tube, wherein a recess is formed at one end of the housing, and wherein one end of the shaft tube is not enveloped by the housing and extends into the recess of the housing;
   disposing a second assembly in the recess of the housing, wherein the second assembly includes a support coupled with the shaft tube and located in the recess of the housing, and wherein the second assembly includes a circuit unit with a circuit board coupled with the support; and
   filling the recess of the housing with a waterproof glue which envelops the circuit unit after curing, forming the stator of the waterproof motor.

2. The method for manufacturing the stator of the waterproof motor as claimed in claim 1, wherein disposing the second assembly comprises connecting a circuit connector of the circuit unit to a coil connector of the coil unit which is exposed to the recess of the housing, wherein filling the recess comprises enveloping the coil connector of the coil unit and the circuit unit with the waterproof glue.

3. The method for manufacturing the stator of the waterproof motor as claimed in claim 1, wherein the coil unit includes a wire wound around a post of the iron core assembly, wherein a free end of the post extends out of the housing and is exposed to the recess after forming the housing, wherein disposing the second assembly comprises disposing the circuit board of the circuit unit in the recess of the housing and engaging the circuit board of the circuit unit with the post of the iron core assembly, and wherein filling the recess comprises enveloping the post and the circuit board with the waterproof glue.

4. The method for manufacturing the stator of the waterproof motor as claimed in claim 1, wherein the thermosetting plastic is bulk molding compound (BMC).

5. The method for manufacturing the stator of the waterproof motor as claimed in claim 1, wherein the waterproof glue is polyurethane (PU) or silicone glue.

6. A stator of a waterproof motor, comprising:
   a first assembly having a coil unit wound around an iron core assembly, wherein the first assembly includes a shaft tube, and wherein the iron core assembly is coupled with an outer periphery of the shaft tube;

a housing made of thermosetting plastic and enveloping the coil unit and the iron core assembly, wherein the housing is coupled with the outer periphery of the shaft tube, wherein a recess is formed at one end of the housing, and wherein one end of the shaft tube is not enveloped by the housing and extends into the recess; and a second assembly disposed in the recess of the housing and including a circuit unit, wherein the recess is filled with a waterproof glue which envelops the circuit unit, wherein the second assembly includes a support coupled with the shaft tube and located in the recess of the housing, and wherein the circuit unit includes a circuit board coupled with the support.

7. The stator of the waterproof motor as claimed in claim 6, wherein the coil unit includes a coil connector exposed to the recess of the housing and connected to a circuit connector of the circuit unit, and wherein the waterproof glue envelops the coil connector of the coil unit and the circuit unit.

8. The stator of the waterproof motor as claimed in claim 6, wherein a shoulder portion is provided on the outer periphery of the shaft tube, wherein the housing includes an axial extension portion abutting the outer periphery of the shaft tube and extending into the recess of the housing, wherein a free end of the axial extension portion abuts the shoulder portion, and wherein the support is connected to the axial extension portion.

9. The stator of the waterproof motor as claimed in claim 6, wherein the iron core assembly includes a post having a free end extending out of the housing and exposed to the recess, wherein the coil unit includes a wire wound around the post of the iron core assembly, wherein the circuit unit includes a circuit board located in the recess of the housing and engaged with the post of the iron core assembly, and wherein the waterproof glue envelops the post and the circuit unit.

* * * * *